(12) United States Patent
Tresser

(10) Patent No.: US 7,051,006 B2
(45) Date of Patent: May 23, 2006

(54) SYSTEM AND METHOD FOR MAINTAINING CUSTOMER PRIVACY

(75) Inventor: Charles P. Tresser, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 797 days.

(21) Appl. No.: 09/779,954

(22) Filed: Feb. 9, 2001

(65) Prior Publication Data

US 2002/0111920 A1    Aug. 15, 2002

(51) Int. Cl.
*G06F 17/60* (2006.01)

(52) U.S. Cl. ............................. 705/74; 705/50; 705/51

(58) Field of Classification Search ................. 705/51, 705/56, 59, 74, 50; 713/151, 164, 165, 166, 713/190; 235/379; 725/9; 340/5.1
See application file for complete search history.

(56) References Cited

U.S. PATENT DOCUMENTS

| 5,710,889 | A | * | 1/1998 | Clark et al. ................. 395/224 |
| 5,850,442 | A | | 12/1998 | Muftic |
| 5,913,024 | A | | 6/1999 | Green et al. |
| 5,987,440 | A | | 11/1999 | O'Neil et al. |
| 5,991,402 | A | * | 11/1999 | Jia et al. ........................ 380/9 |
| 6,061,789 | A | | 5/2000 | Hauser et al. |
| 6,070,148 | A | | 5/2000 | Mori et al. |
| 6,092,053 | A | | 7/2000 | Boesch et al. |
| 6,098,056 | A | | 8/2000 | Rusnak et al. |
| 6,128,624 | A | | 10/2000 | Papierniak et al. |
| 2004/0148290 | A1 | * | 7/2004 | Merenda et al. .............. 707/10 |

FOREIGN PATENT DOCUMENTS

JP    411274999 A * 10/1999

* cited by examiner

*Primary Examiner*—Elisca Pierre Eddy
(74) *Attorney, Agent, or Firm*—Douglas A. Lashmit; Hoffman, Warnick & D'Alessandro LLC

(57) ABSTRACT

A system and method for maintaining customer privacy where an identity of the customer must be divulged. The invention includes separating data associated with the institution into a first database of private data and a second database of public data; storing an encrypted copy of the private data and an unencrypted copy of the public data with an intermediary service provider; providing to the customer a security system that allows the customer to decrypt the encrypted data and remain anonymous to the intermediary service provider; merging the encrypted copy of the private data and the unencrypted copy of the public data; and providing an interface that allows the customer to view the merged data.

7 Claims, 3 Drawing Sheets

SYSTEM AND METHOD FOR MAINTAINING CUSTOMER PRIVACY

BACKGROUND OF THE INVENTION

1. Field of the Invention

The present invention relates generally to network privacy, and more particularly to a system and method for maintaining the privacy of institutional customers during network transactions.

2. Related Art

With the advent of the world wide web (i.e., the web) and Internet, the use of electronic commerce has exploded. In an effort to better market goods and services, technologies have been developed that track the patterns of individual consumers, or groups of consumers. Such information can be put to good use, namely by improving the quality of services, delivering differentiated services, improving customer retention, etc. Unfortunately, use of such technologies can also often result in personal information being unknowingly used, sold or otherwise disseminated, and may in most cases be considered a form of invasion of the consumers' privacy.

Accordingly, one of the challenges of this new type of commerce is to provide privacy protection to consumers who use services on the Internet. One solution is to implement technologies that will allow consumers to engage in electronic commerce with complete protection of privacy and/or even complete anonymity. However, there are some instances when complete privacy or anonymity between a consumer and an institution (e.g., a merchant, a service provider, a bank, etc.) is not practical. For instance, a bank may be legally obligated to know the identity of a consumer conducting transactions with the bank. In addition, a consumer may want a merchant to know his or her identity during a business transaction in order to streamline the process. In these cases, encryption techniques, such as public key infrastructure (PKI) can be utilized to ensure that the information being transferred remains secure against eavesdroppers.

A problem arises however in situations where institutions offer a combination of private services, such as on-line banking, and non-private or public services, such as shopping opportunities. For example, a merchant web page may include a web portal giving access to a variety of services and information delivered by the merchant or other parties. In such cases, the merchant has the ability to observe the interaction between the customer and the web pages accessed through the portal. Because the exact identity of the customer is known, the possibility exists of exploiting personal information, which may result in an invasion of the customer's privacy. Similar problems arise in the case of business customers. For instance, observation of the web behavior may allow one to guess the commercial strategy of a business customer.

To combat this potential exploitation, some companies have adopted strict policies that forbid themselves from observing their customers' web behavior. It is however important to recognize that tracking the overall trends of consumers not only helps the merchant improve their business, but it also helps the customer to be better served. Accordingly, the ability to gather and utilize business intelligence helps commercial efficiency. Thus, there exists a need to provide capabilities for gathering business intelligence on the Internet while protecting the privacy of consumers, particularly in the case where the consumer's identity is known to the institution providing goods and/or services.

SUMMARY OF THE INVENTION

The present invention provides a system and method that will allow for the gathering of business intelligence information in a network environment in a manner that will ensure the privacy of a consumer even in a case where the consumer must reveal his or her identity.

In a first aspect, the invention provides a system for delivering institutional data to a customer, comprising: an institutional server, wherein the institutional server includes a system for separately serving a first database containing private data and a second database containing public data; a service provider, wherein the service provider includes a system for receiving an encrypted version of the private data and an unencrypted version of the public data; and a client, wherein the client includes a system for displaying a merged version of the private and public data.

In a second aspect, the invention provides a method of preserving privacy between a customer and an institution in a computer network environment, comprising the steps of: separating data associated with the institution into a first database of private data and a second database of public data; storing an encrypted copy of the private data and an unencrypted copy of the public data with an intermediary service provider; providing to the customer a security system that allows the customer to decrypt the encrypted data and remain anonymous to the intermediary service provider; merging the encrypted copy of the private data and the unencrypted copy of the public data; and providing an interface that will allow the customer to view the merged data.

In a third aspect, the invention provides a method of preserving privacy between a customer and an institution in a computer network environment, comprising the steps of: separating data associated with the institution into a first database of encrypted private data and a second database of public data; loading an unencrypted copy of the public data to a service provider; loading to a client the encrypted private data from the institution and the unencrypted copy of the public data from the service provider; providing to the customer a security mechanism that will allow the customer to decrypt the encrypted data and remain anonymous to the service provider; and providing an interface that allows the customer to view the encrypted copy of the private data and the unencrypted copy of the public data.

In a fourth aspect, the invention provides program product stored on a recordable medium that preserves privacy between a customer and an institution in a computer network environment, comprising: a system for separating data associated with the institution into a first database of encrypted data and a second database of unencrypted data; a system for providing a copy of the second database of unencrypted data to an intermediary service provider; an interface that allows the customer to view the first database of encrypted data and the copy of the second database of unencrypted data provided to the intermediary service provider; and a security system that allows the customer to decrypt the encrypted data and remain anonymous to the intermediary service provider.

BRIEF DESCRIPTION OF THE DRAWINGS

The preferred exemplary embodiment of the present invention will hereinafter be described in conjunction with the appended drawings, where like designations denote like elements, and.

DETAILED DESCRIPTION OF THE INVENTION

Figure 1:
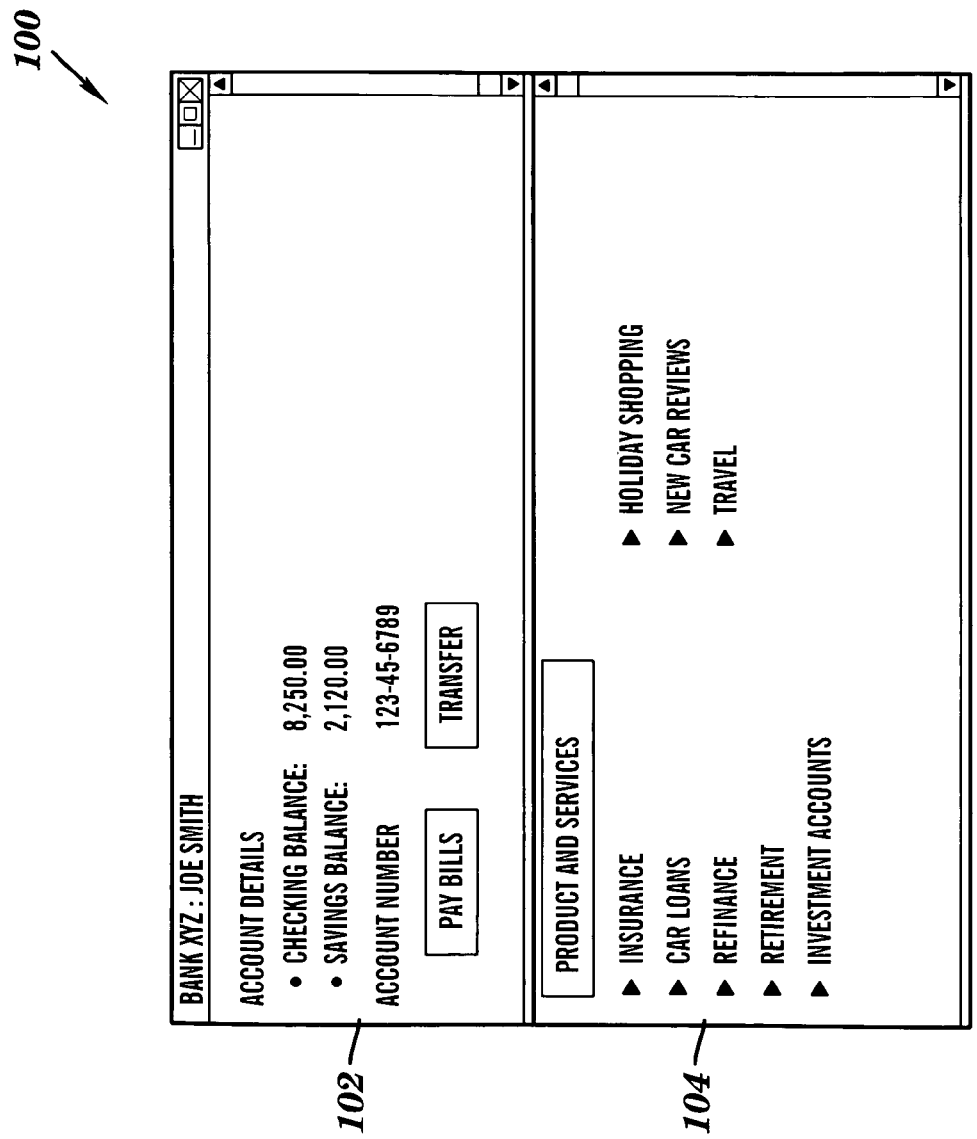
FIG. 1 depicts a graphical user interface displaying private and public data in accordance with the present invention.

Referring now to FIG. 1, an exemplary graphical user interface (GUI) 100 is depicted showing a web page for a financial institution (Bank XYZ). GUI 100 includes a private window 102 for displaying private data relating to a customer account, and a public window 104 for displaying non-private or public data available by or through the financial institution. As will be described in further detail below, the present invention provides a mechanism for anonymously gathering information regarding the use of the public data by the consumer, even though the consumer's identity is known by the private window 102.

As can be seen, the private window 102 includes sensitive data relating to account information for consumer Joe Smith, as well as options for performing sensitive transactions relating to banking services. For example, the customer has the ability to pay bills or transfer funds by selecting the appropriate options. Because of the nature of the data being transferred back and forth between the consumer and the institution in private window 102, private data is preferably processed in an encrypted format in order to maintain consumer privacy. The specific implementations for handling private data are described in further detail below.

In contrast, public window 104 includes non-sensitive information and hypertext links to other web pages where further details regarding each of the selections can be obtained. In an exemplary embodiment, public window 104 may comprise a web portal. Because the data displayed in public window 104 does not contain sensitive information, the data does not need to be encrypted. Thus, valuable business intelligence information (e.g., consumer interests, etc.) can be obtained from public window 104 by tracking the behavior of the consumer. In order to ensure privacy, the identity of the consumer, which is available for transactions in private window 102, is not made available for transactions occurring through public window 104. To accomplish this, the two windows 102 and 104 are operationally distinct and receive their data through separate channels, which is then merged together at the GUI 100.

It should be understood that although the present invention is described with respect to private and public data, the invention can apply to any system in which there exists different types of downloadable data. In addition, it should be understood that GUI 100 is presented for exemplary purposes only, and other configurations and/or types of interfaces for displaying private and public data could be used.

Figure 2:
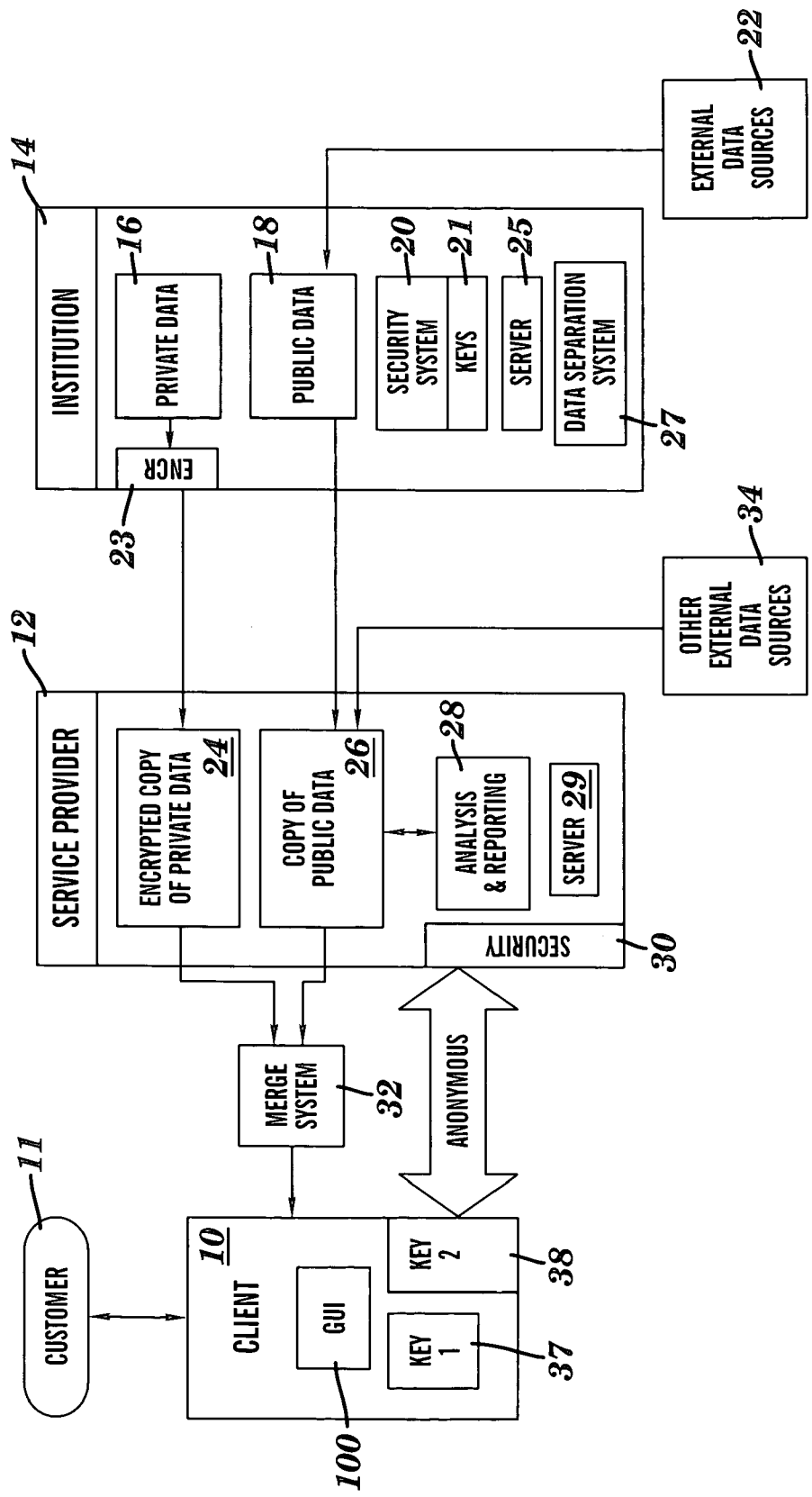
FIG. 2 depicts a block diagram of a privacy system in accordance with a first embodiment of the present invention.

Referring now to FIG. 2, a system for handling private data and public data to achieve the above-mentioned goals is shown. The system essentially comprises a client 10, a service provider 12, and an institution 14. Client 10 provides an interface through which customer 11 can obtain data from institution 14 and may comprise, for example, a web browser, a web phone, a personal digital assistant, etc. Institution 14 may comprise any provider of goods and/or services that distributes both private data 16 and public data 18 (collectively referred to as institutional data). Institution 14 may comprise, for example, a bank, a stock broker, a merchant, etc.

In order to ensure privacy between the customer 11 and the institution 14, service provider 12 acts as an intermediary source of the institution's private data 16 and public data 18. Accordingly, when a customer 11 requests information from institution 14, the information is passed from institution 14 in the form of private data 16 and/or public data 18 to service provider 12. Service provider 12 then forwards the data to a merge system 32 which merges the data for display on GUI 100 within client 10. Although shown as a separate system, merge system 32 could likewise be incorporated into client 10, or service provider 12.

As noted, the system seeks to address several goals. A first goal is that private data 16 provided by institution 14 must be delivered to customer 11 in a secure environment such that the nature of the transaction, and information relating thereto, is kept private between the customer and institution 14. A second goal is to deliver public data 18 from the institution 14 to the customer 11 in an unsecured format that will allow for the collection of business intelligence while protecting the identity of customer 11. In order to achieve these goals, customer 11 and/or client 10 are provided with a pair of keys 37 and 38 from institution 14. The first key 37 allows client 10 to decrypt encrypted private data originating from institution 14. In this embodiment, private data 16 is encrypted with encryption system 23 and is then passed to service provider 12. Accordingly, service provider 12 cannot access the private data 16 being routed to client 10 since service provider 12 only maintains an encrypted copy of private data 24. Any type of cryptography may be used to secure private data 16, including using secret key cryptography or private key/public key pairs, which are well known in the art.

The second key 38 provided to client 10 is utilized to maintain an anonymous relationship with service provider 12 and perhaps determine the level of services available to customer 11. Specifically, service provider 12 includes a security system 30 that is configured to operate with the second key 38 in order to ensure that the identity of customer 11 cannot be known to service provider 12 or institution 14. When public data 18 is requested by client 10, a copy of the public data 26 is loaded to service provider 12, and served to client 10 by server 29. In order to gather business intelligence information, service provider 12 includes an analysis and reporting system 28 that can examine the requests and trends of customer 11 made with regard to the copy of the public data 26. Because the customer's identity is not known to service provider 12, there is no threat of invading the privacy of customer 11.

Several protocols and commercial models exist that allow communication on the Internet with complete anonymity. One example is given on the home page of the NetBill Security and Transaction Protocol, entitled "Maintaining Privacy In Electronic Transactions" by Benjamin T. H. Fox, which can be obtained on the Internet at <www.ini.cmu.edu/netbill>. The use of the second key 38 may be complemented by a password, for instance chosen by customer 11 at the time of first use of the service. Additionally, the second key 38 may be hidden in secure hardware (e.g., security system 30). Notice that the use of secure hardware may allow solutions such as verification of the password in the hardware before it can be used for communications and/or transactions. Moreover, the use of such secure hardware, from smart cards to the most secure IBM 4758 PCI cryptographic coprocessor, may allow for the elimination of a password for the communication with service provider 12.

It should be recognized that in the case where institution 14 is acting as a portal, some of its public data 18 may originate from external data sources 22, such as other web sites. Similarly, service provider 12 may also provide other external data sources 34 in addition to the copy of public data 26 received by institution 14. Furthermore, institution 14 may include a security system 20 responsible for, among other things, distributing keys 21 to new customers. Institution 14 may also comprise a server 25 for serving the private data 16 and public data 18, as well as a data separation system 27 for maintaining separate databases of private and public data.

Figure 3:
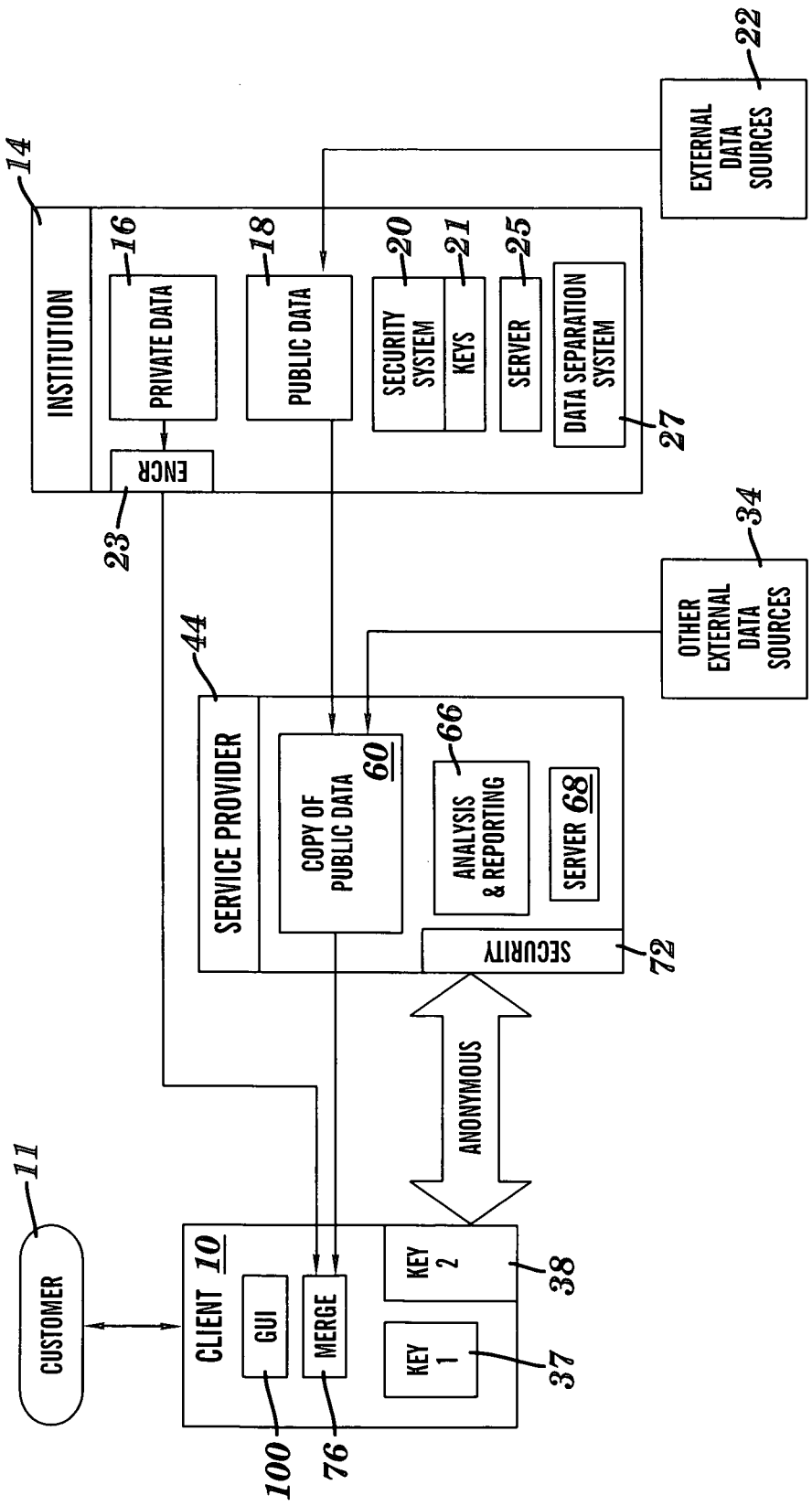
FIG. 3 depicts a block diagram of a privacy system in accordance with a second embodiment of the present invention.

Referring now to FIG. 3, an alternate embodiment of the privacy system is depicted. In this setting, institution 14 comprises the same features and functionality as described with respect to the system shown in FIG. 2. In this case, however, service provider 44 does not maintain a copy of the encrypted private data. Instead, service provider 44 only maintains a copy of the public data 60, and the private data 16 is downloaded directly to client 10. The private data 16 and copy of public data 60 are then merged at client 10 with merge system 76.

Similar to the embodiment depicted in FIG. 2, client 10 includes a first key 37 that allows the customer to view encrypted private data 16 downloaded directly from institution 14. In addition, client 10 includes a second key 38 that allows the identity of customer 11 to remain anonymous to service provider 44. As in the previous case, the second key 38 is configured to operate with security system 72 on service provider 44 to ensure anonymity. Service provider 44 likewise includes an analysis and reporting system 66 that allows business intelligence to be gathered without knowing an identity of customer 11.

It is understood that the present invention can be realized in hardware, software, or a combination of hardware and software. The components as described herein can be realized in a centralized fashion in a single computerized workstation, or in a distributed fashion where different elements are spread across several interconnected computer systems (e.g., a network). Any kind of computer system—or other apparatus adapted for carrying out the methods described herein—is suited. A typical combination of hardware and software could be a general purpose computer system with a computer program that, when loaded and executed, carries out the methods described herein. Alternatively, a specific use computer, containing specialized hardware for carrying out one or more of the functional tasks of the invention could be utilized. The present invention can also be embedded in a computer program product, which comprises all the features enabling the implementation of the methods described herein, and which—when loaded in a computer system—is able to carry out these methods. Computer program, software program, program, module, mechanism or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the preferred embodiments of this invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims.

The invention claimed is:

1. A system for delivering institutional data to a customer, comprising:
    an institutional server, wherein the institutional server includes a system for separately serving a first database containing private data and a second database containing public data;
    a service provider, wherein the service provider includes a system for receiving an encrypted version of the private data and an unencrypted version of the public data from the institutional server;
    a client, wherein the client includes a system for displaying a merged version of the private and public data; and
    a system for making the customer anonymous to the service provider, including a mechanism for determining a service level available to the customer.

2. The system of claim 1, wherein the client includes a mechanism for decrypting the encrypted private data.

3. The system of claim 1, wherein the service provider includes a system for analyzing the use of the public data by the customer without knowing an identity of the customer.

4. The system of claim 1, wherein the merged version of the private and public data is downloaded to the client by the service provider.

5. The system of claim 1, wherein the private and public data are downloaded to the client by the institutional server and service provider, respectively.

6. The system of claim 1, wherein the encrypted version of the private data is encrypted using a public key infrastructure protocol.

7. The system of claim 1, wherein the client includes an interface that can be customized into a first window for viewing the public data and a second window for viewing the private data.

* * * * *